(12) United States Patent
Schuler et al.

(10) Patent No.: US 12,528,623 B2
(45) Date of Patent: Jan. 20, 2026

(54) CONTAINER SYSTEM WITH BASE AND FOLDABLE LID

(71) Applicant: SABERT CORPORATION, Sayrevillle, NJ (US)

(72) Inventors: Jason S. Schuler, Maplewood, NJ (US); Yohanan Siskindovich, Glen Ridge, NJ (US)

(73) Assignee: SABERT CORPORATION, Sayrevillle, NJ (US)

( * ) Notice: Subject to any disclaimer, the term of this patent is extended or adjusted under 35 U.S.C. 154(b) by 272 days.

(21) Appl. No.: 17/555,778

(22) Filed: Dec. 20, 2021

(65) Prior Publication Data
US 2022/0194670 A1    Jun. 23, 2022

Related U.S. Application Data

(60) Provisional application No. 63/129,322, filed on Dec. 22, 2020.

(51) Int. Cl.
*B65D 43/16* (2006.01)
*B65D 1/26* (2006.01)
(Continued)

(52) U.S. Cl.
CPC ............. *B65D 43/161* (2013.01); *B65D 1/26* (2013.01); *B65D 21/0217* (2013.01);
(Continued)

(58) Field of Classification Search
CPC .... B65D 43/161; B65D 1/26; B65D 21/0217; B65D 43/24; B65D 2543/00203;
(Continued)

(56) References Cited

U.S. PATENT DOCUMENTS

| 466,479 | A | * | 1/1892 | Winchester | ............... B65D 5/16 229/122 |
| 621,559 | A | * | 3/1899 | Ebert | ........................ B07B 1/02 220/826 |

(Continued)

FOREIGN PATENT DOCUMENTS

| CN | 1738748 A | * | 2/2006 | ........... B65D 43/161 |
| CN | 112810966 A | * | 5/2021 | ............. B65D 43/16 |

(Continued)

*Primary Examiner* — Don M Anderson
*Assistant Examiner* — Eric C Baldrighi
(74) *Attorney, Agent, or Firm* — COZEN O'CONNOR

(57) ABSTRACT

A container system having a base and a lid. The base has a bottom and one or more sidewalls extending from the bottom to define an interior volume, the base having a rim at a peripheral edge of the one or more sidewalls, the rim defining a first engagement region. The system also has a lid having a peripheral outer rim defining a second engagement region, the first and second engagement regions dimensioned to releasably engage with each other. The lid has a hinged region having a first hinge about which the lid folds as a first part of the lid is lifted from the base to disengage portions of the first and second engagement regions from one another, to provide access to the interior volume of the base while a second part of the lid on an opposite side of the hinge remains secured and attached to the base.

12 Claims, 8 Drawing Sheets

(51) Int. Cl.
*B65D 21/02* (2006.01)
*B65D 43/24* (2006.01)

(52) U.S. Cl.
CPC .... *B65D 43/24* (2013.01); *B65D 2543/00203* (2013.01); *B65D 2543/005* (2013.01); *B65D 2543/00537* (2013.01); *B65D 2543/00555* (2013.01); *B65D 2543/00657* (2013.01); *B65D 2543/00685* (2013.01); *B65D 2543/00759* (2013.01); *B65D 2543/00796* (2013.01)

(58) Field of Classification Search
CPC .... B65D 2543/005; B65D 2543/00537; B65D 2543/00555; B65D 2543/00657; B65D 2543/00685; B65D 2543/00759; B65D 2543/00796; B65D 2543/00027; B65D 2543/00101; B65D 2543/00296; B65D 2543/00379; B65D 2543/00407; B65D 2543/00527; B65D 2543/00648; B65D 2543/00731; B65D 2543/00805; B65D 43/0212
USPC ........................................................ 220/826
See application file for complete search history.

(56) References Cited

U.S. PATENT DOCUMENTS

| | | | | |
|---|---|---|---|---|
| 3,392,870 | A * | 7/1968 | Schulz | B65D 43/161 220/651 |
| 3,412,890 | A * | 11/1968 | Rich | B65D 43/161 220/837 |
| 4,358,025 | A * | 11/1982 | Urion | B65D 43/0212 215/DIG. 1 |
| 4,391,386 | A * | 7/1983 | Moret | B65D 21/064 220/819 |
| RE33,231 | E * | 6/1990 | Gallery, IV | B65D 43/161 220/826 |
| 5,002,197 | A * | 3/1991 | Ponsi | B65D 43/161 220/837 |
| 6,523,713 | B1 | 2/2003 | Helms | |
| 7,150,380 | B2 | 12/2006 | Hoepner | |
| 8,733,585 | B2 * | 5/2014 | Abdi | B65D 43/0218 220/826 |
| 8,789,718 | B1 * | 7/2014 | Daniel | B65D 51/185 220/254.1 |
| 9,308,149 | B1 * | 4/2016 | Niskey, Jr | A61J 1/1425 |
| 9,809,356 | B2 | 11/2017 | Kissner | |
| 11,091,302 | B2 | 8/2021 | Schuler et al. | |
| 2006/0124643 | A1 * | 6/2006 | Markert | B65D 43/161 220/782 |
| 2007/0045140 | A1 * | 3/2007 | Klein | B65D 71/00 206/349 |
| 2008/0083768 | A1 * | 4/2008 | Luburic | B65D 47/0847 220/810 |
| 2008/0190951 | A1 * | 8/2008 | Gallagher | B65D 43/021 220/780 |
| 2010/0037565 | A1 * | 2/2010 | Meissen | A61B 50/36 53/492 |
| 2011/0024421 | A1 * | 2/2011 | Luburic | B65D 43/161 220/265 |
| 2012/0279969 | A1 | 11/2012 | Antal | |
| 2014/0021214 | A1 * | 1/2014 | Jack | B65D 43/0202 220/826 |
| 2018/0346193 | A1 * | 12/2018 | Hanna | B65D 25/00 |
| 2020/0165055 | A1 * | 5/2020 | Barfoot | B65D 43/164 |
| 2021/0070497 | A1 * | 3/2021 | Walker | B65D 21/0223 |
| 2023/0025060 | A1 * | 1/2023 | Gasbarro | B65D 43/161 |

FOREIGN PATENT DOCUMENTS

| | | | | |
|---|---|---|---|---|
| EP | 0056755 | A1 * | 7/1982 | ......... B65D 43/161 |
| EP | 2226265 | A1 | 9/2010 | ......... B65D 43/161 |
| KR | 200334767 | Y1 * | 12/2003 | ......... B65D 43/161 |
| KR | 200342903 | Y1 * | 2/2004 | ......... B65D 43/162 |
| KR | 100736433 | B1 * | 7/2007 | ......... B65D 43/161 |
| KR | 101392394 | B1 * | 5/2014 | ............. A47J 47/08 |
| WO | WO-0156899 | A1 * | 8/2001 | ......... B65D 43/0218 |
| WO | WO-2007064833 | A2 * | 6/2007 | ......... B62B 21/0233 |

\* cited by examiner

CONTAINER SYSTEM WITH BASE AND FOLDABLE LID

RELATED APPLICATIONS

This application claims priority from U.S. Provisional Patent Application Ser. No. 63/129,322, which was filed on Dec. 22, 2020.

BACKGROUND

Field of the Invention

The disclosed embodiments are directed to a container system having a base and a lid, where the lid folds as a first part of the lid is lifted to provide access to the interior volume of the base while a second part of the lid remains attached to the base.

Description of the Related Art

Food storage containers have become increasingly prevalent in a busy society. More and more people are eating on the go and even in their cars. Eating on the go, however, creates unique problems with traditional food storage containers that have yet to be addressed. For example, food storage containers typically comprise a base and lid which are formed of transparent or translucent plastic and which are attachable to and detachable from each other. In particular, a closed container requires the lid to be fully separated from the base to provide access to the container contents. For people eating on the go, this can make it difficult to consume the contents and also presents unwanted opportunity for spillage and contamination. Moreover, additional space is needed for placement of the separated container lid, such as on a passenger seat of a vehicle, on the vehicle floor and the like. The requirement for such additional space for the separated lid is a further drawback of existing container systems.

There is a need for an improved food container—particularly in an age when more and more restaurants seek to increase sales through online and take-out business—to enhance the consumer on-the-go dining experience.

SUMMARY OF THE INVENTION

Disclosed embodiments are directed to a container system comprising a base and a friction-fit (e.g., snap-fit) lid attachable to the base. The components can be configured in, but are not limited to, any rectilinear shape. The embodiment described herein provides a food container that can maintain its footprint in its closed position and in a partially opened configuration while being used in both hot and cold food applications.

The system includes at least one container base and a lid. The lid is configured to be securely and detachably joined to the base about the periphery of the base in a press-fit arrangement. The lid is also configured to be partially opened in a folded configuration along a hinged region to provide access to the container content through the opened section of the lid.

The compartments may be configured in a number of ways including but not limited to half-and-half split or a one-third—two-thirds split.

The folding lid of the disclosed embodiment may also include a boss or protrusion on one region of the hinged portion of the lid and an opening directly opposite the boss within which the boss is received when one side of the lid is fully opened, thereby allowing the opened portion of the lid to affix to the secured portion of the lid. The lid may have one or more hinging mechanisms that permit the opened portion of the lid to securely attach to the closed portion, while leaving a space between the opened portion and any lands formed on the top of the lid which, for example, facilitate stacking of the lids when not being used with a base, to to facilitate a secure stacking of one fully assembled package on top of another fully assembled package in a takeout delivery scenario.

The embodiments described herein provide ease of operation. The hinges and positioned boss and recess on the lid are intuitive to use and require little to no training. Closing and opening the lid requires little force.

In accordance with an aspect of the invention, a container system is disclosed having a base and a lid. The base has a bottom and one or more sidewalls extending from the bottom to define an interior volume, the base having a rim at a peripheral edge of the one or more sidewalls, the rim defining a first engagement region, the rim having an inner periphery substantially smoothly contoured about its entire extent, the rim. The system also has a lid having a peripheral outer rim defining a second engagement region, the first and second engagement regions are dimensioned to releasably engage with each other. The lid has a hinged region having a first hinge about which the lid folds as a first part of the lid is lifted from the base to disengage portions of the first and second engagement regions from one another, to provide access to the interior volume of the base while a second part of the lid on an opposite side of the hinge remains secured and attached to the base.

In accordance with another aspect of the invention, a container system includes a base having a bottom and one or more sidewalls extending from the bottom to define an interior volume, the base having a rim at a peripheral edge of the one or more sidewalls; and a lid having a peripheral outer rim, the lid comprising a hinged region having first and second hinges, defining an interstitial area between the first and second hinges, about which hinged region the lid folds as a first part of the lid is lifted to provide access to the interior volume of the base while a second part of the lid remains attached to the base.

In another aspect, the hinged region extends across a width of the lid in alignment with ends of partial peripheral troughs.

In another aspect, the first part of the lid forms an interference fit with at least a first portion of the rim of the base.

In another aspect, the lid comprises a lock to removably attach the first part of the lid to the second part of the lid when the lid is folded to a position in which a top surface of the first part of the lid meets a top surface of the second part of the lid.

In another aspect, the lock comprises an upward protrusion on one of the first part of the lid and the second part of the lid and an indent to receive the protrusion on the other of the first part of the lid and the second part of the lid.

In another aspect, the base is substantially rectangular or substantially square and is formed of plastic or molded fiber, such as molded fiber material, e.g., pulp, and the lid has a corresponding substantially rectangular or substantially square shape and is formed of plastic.

In another aspect, the lid further includes land portions having a first height, the first height being less that a height of the protrusion of the lock.

BRIEF DESCRIPTION OF THE DRAWINGS

In the drawings, identical reference numbers identify similar elements or acts. For example, the shapes of various elements and angles are not necessarily drawn to scale, and some of these elements are arbitrarily enlarged and positioned to improve drawing legibility. Further, the particular shapes of the elements as drawn, are not necessarily intended to convey any information regarding the actual shape of the particular elements, and have been solely selected for ease of recognition in the drawings. In the drawings.

DETAILED DESCRIPTION OF THE EMBODIMENTS

Figure 1:
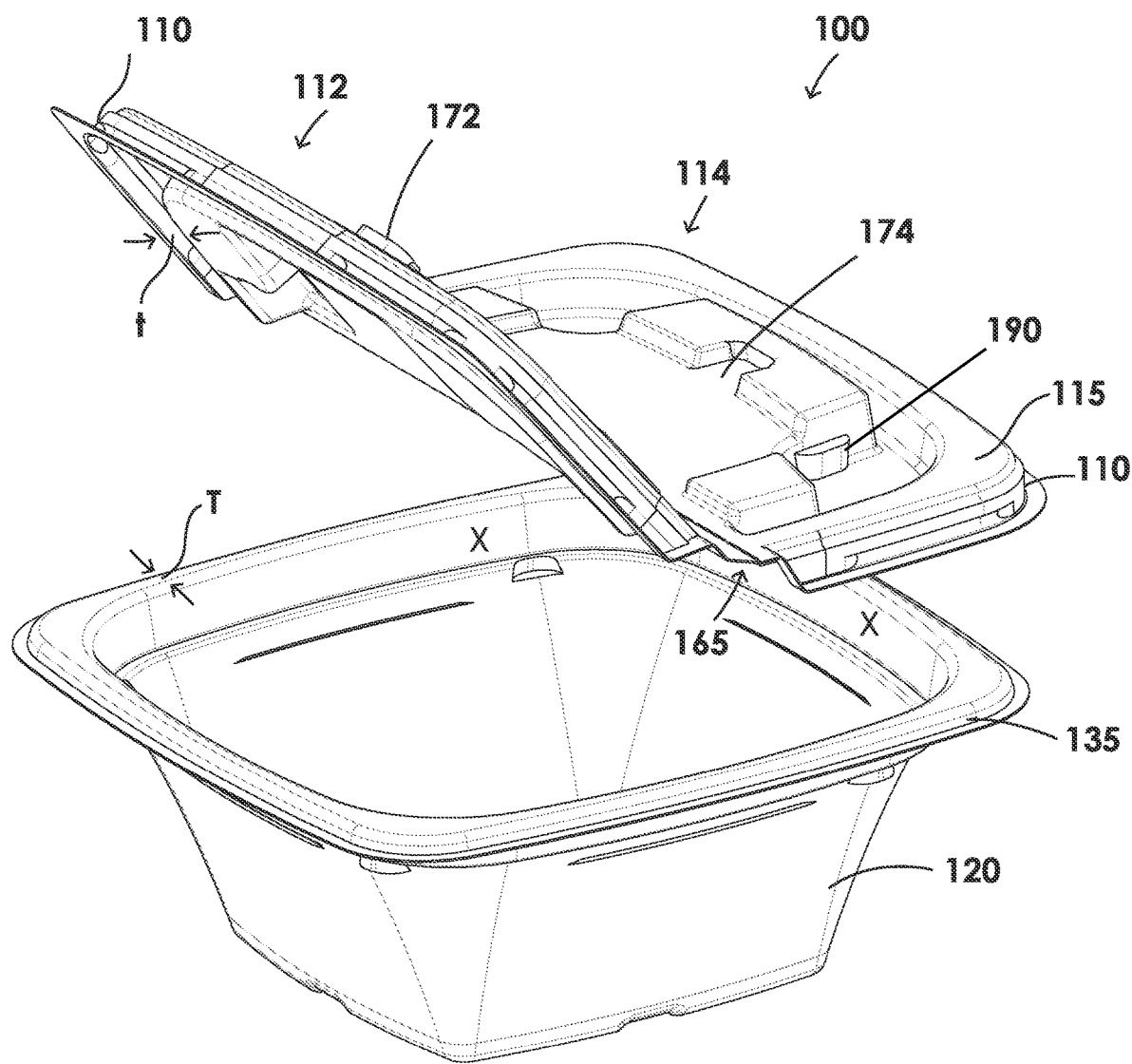
FIG. 1 is a perspective view of a container system having a foldable lid and a base, with the lid shown unattached to the base and partially folded, according to at least one illustrated embodiment.
Figure 2:
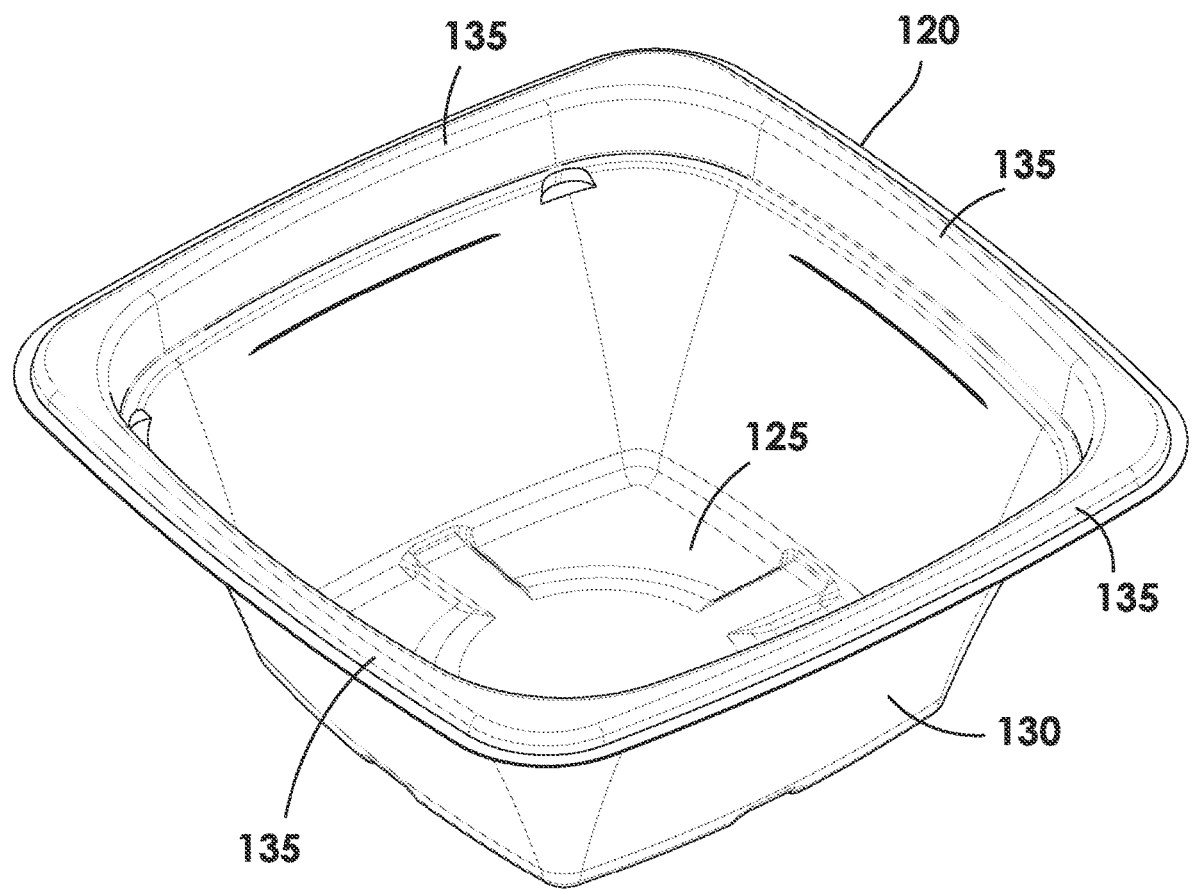
FIG. 2 is a perspective view of the base of the container system of FIG. 1, according to at least one illustrated embodiment.

FIG. 1 is a perspective view of a container system 100 having a foldable lid 110 and a base 120. In the figure, the lid 110 is unattached to the base 120 and partially folded. FIG. 2 is a perspective view of the base 120 of the container system 100. The base 120 has a bottom 125 and one or more sidewalls (e.g., sidewalls 130) extending from the bottom 125 to define an interior volume. In the example depicted, the base 120 is substantially rectangular, in this figure square, and therefore can be said to have four continuous sidewalls 130. Other shapes for the base 120 are also possible, such as, for example, round, oval, (a round or oval base can be said to have a single peripheral sidewall), with the lid 110 having a corresponding shape.

The base 120 has one or more rims 135 of a thickness "T" at each respective upper edge of the sidewalls 130 which form a first engagement region. As shown, the rim has an inner periphery, including a region X on an interior of the base and just below where the lid will attach, which is substantially smoothly contoured about the entire extent of the rim. In implementations, the base 120 may be made in a thermoforming process, in which case the mold used to form the base 120 may have convex formations on opposite sides which cause the formation of an indentation, from the exterior toward the interior, on each side of the base 120. Alternatively, the base can be formed of a molded fiber material such as pulp or other substrates. The lid however, will be made of a thermoformed plastic in either case.

Figure 3:
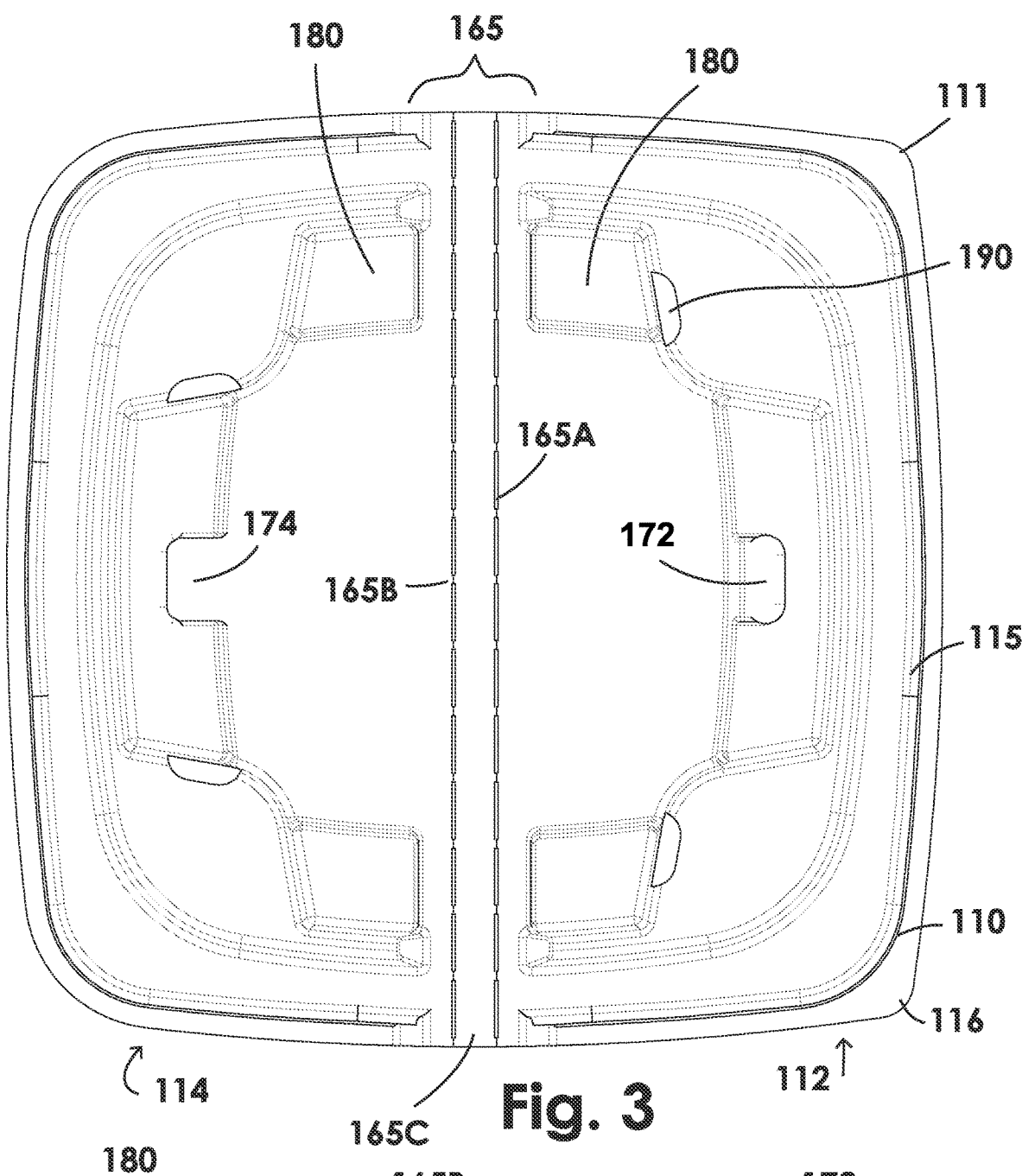
FIG. 3 is a plan view of the underside of the foldable lid of the container system of FIG. 1, according to at least one illustrated embodiment.
Figure 4:
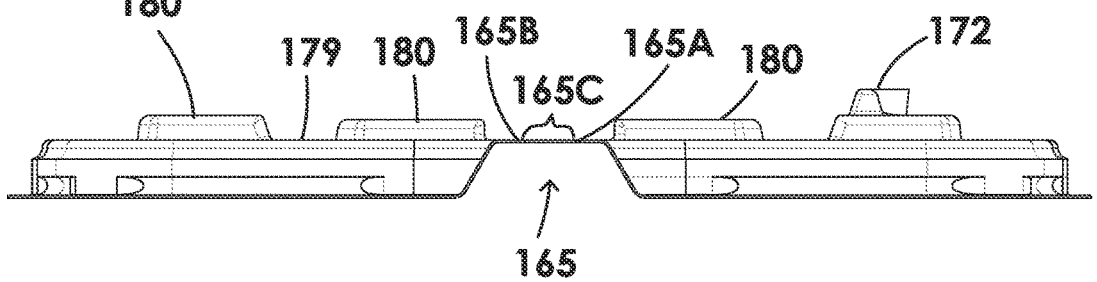
FIG. 4 is a side edge view of the foldable lid of the container system of FIG. 1, according to at least one illustrated embodiment.

FIG. 3 is a plan view of the underside of the foldable lid 110 of the container system 100. FIG. 4 is a side edge view of the foldable lid 110. The lid 110 has four peripheral outer rims 115 defining a receiving region or channel with a dimensioned "t" and configured as a second receiving region to receive therein the first receiving region, e.g., a corresponding rim 115, to couple with a respective rim 135 of the base 120 in a snap-fit or friction-fit arrangement. Thus, the thickness T of the first engagement region of the rims 135 of the base is such that it fits snugly within the second engagement region/channel 115 of the lid. Although the embodiment shows the receiving region 115 on the lid to receive rim 135 of the base, the opposite arrangement can readily be realized by one of ordinary skill.

In embodiments, the outer rim 115 may contact, or nearly contact, the rim 135 of the base 120 (e.g., the top or inside of the rim 135), by having a shape or dimension, e.g., profile, which corresponds to and/or conforms to the shape of the rim 135 of the base 120. In this embodiment, the two opposing ones of the four rims 115 are each continuous and unbroken over its longitudinal extent. Other embodiments may include a segmented rim 115 for manufacturing and application ease of operation. Each of the other two rims 115 has a break (see FIG. 4) (e.g. trapezoidal shaped) formed at a mid-point of its longitudinal extent. Other shaped breaks are possible such as a triangular-shaped break, half-circle shaped break and so on.

In FIGS. 1 and 3-5 the lid 110 has a double hinged region 165 having first and second hinges 165A and 165B, and a longitudinally extending area 165C arranged between and bounded by the hinges 165A and 165B.

Depending upon which side of the lid is lifted for opening, the nearest hinge to the opening side will function as the primary hinge, i.e., for the folding of the lid back to provide access to the content in the compartment. The other hinge will fold to the extent necessary to permit a flexing of the hinge portion 165 upwardly.

The lid further includes an upward protrusion 172 and an indent 174 which are configured to mate with each other to provide a securing feature to fasten a pivoted portion of the lid (e.g., portion 112 in FIG. 1) to lid portion 114. By virtue of the shape formed by the hinged region 165, and the dual spaced apart hinges 165A and 165B in this region 165, even when the snap fit is effected between the upward protrusion 172 and the indent 174, a gap is formed so that the open portion of the lid 112 primarily only contacts the top of the closed portion 114 at the end region of the folded portion 112 at which the snap fit occurs between the upward protrusion 172 and the indent 174.

In the foregoing manner, the first part 112 of the lid 110 (e.g., a section of the lid 110 having a lifting tab 116) is lifted to separate portion 112 from the portion of the base to which is was attached by dislodging the portions of rim 135 from the corresponding portions of rim 115, to thereby provide access to the interior volume of the base 120, while the second part 114 of the lid 110 (e.g., the remaining half-section of the lid 110) on an opposite side of the hinge region 165 remains attached to the base 120. The hinged region 165 extends across a width of the lid 110. The hinges 165A and 165B are depicted in the drawings as dashed lines for the sake of clarity. However, in embodiments, each hinge may comprise one or more fold lines and/or various other features to provide a well-controlled folding operation, as described in further detail below.

It should be understood that the inclusion of one or more lifting tabs 116 is optional. For example, without the tab 116, a user may be able to pry apart one side of the lid from the base by grasping and separating their respective edges. However, the inclusion of a lifting tab on one or both sides of the lid and/or base may facilitate opening the container.

The hinges 165A and 165B may be implemented by a number of different methods and/or geometric arrangements, some of which are common in the field. In general, the techniques are aimed at weakening a defined folding area (e.g., a linear area) enough to allow for a controlled and repeatable folding or swing action.

For example, each of hinges may be formed by scoring one or more cuts, partial cuts, perforations and/or scratches on the surface of the lid to weaken the folding area without causing a complete separation of the original geometry. Such scoring techniques typically do not involve a fully-penetrating cutting operation but, rather, leave some material thickness intact which provides hinge-like functionality. Other hinging features that provide a folding or swing action may be used, such as employing narrow channels that thin out the material formed in-between and provide a weak area that easily bends.

The lid 110 has a lock to removably attach the first part 112 to the second part 114 when folded. The lock comprises the above-mentioned upward protrusion 172 on either the first part 112 or the second part 114 of the lid 110 and the indent 174, which is configured to receive the upward protrusion 172 on the other part of the lid 110.

The first part 112 and the second part 114 each independently form an interference or friction fit, via the dimensions of the outer rim 115 of the lid, and the rim 135 of the base 120. Therefore, as one part of the lid 110 (e.g., the first part 112) is lifted to provide access to the interior volume of the base 120, the other part of the lid 110 (e.g., the second part 114) remains attached to the base 120, and vice versa.

In implementations, as shown in the view of FIG. 4, the upper side of the lid 110 includes plural four sided lands 180. The lands 180 are formed so as to permit a number of lids 110 in their non-folded state to be stacked on top of one another for storage of this component. To facilitate the adequate spacing and easy separation of the stacked lids from one-another, details 190 are provided proximate to the lands 180 (see FIGS. 1 and 3). Lands 180 are also used to facilitate a secure stacking of one fully assembled package (base and lid) on top of another fully assembled package in a takeout delivery kitchen. The geometry of lands 180 in the lid corresponds with some aspects or details of bottom 125 in base 120 to provide a secure stacking.

However, as will be understood, if the first part 112 of the lid is only able to fold over a single hinge, the lands 180 on either side of such a single hinge would interfere with each other upon folding before both lid parts are positions parallel to each other.

This gap provides clearance for the two grooves 165A, 1658, and the area 165C, which together provide a vertical offset in the hinge region, which prevents the opposing lands 180 from contacting one another upon folding the lid. To additionally facilitate this non-interference between opposing lands 180 during folding of the lid, the upward protrusion 172 is configured to be taller than the height of the lands 180.

In implementations, the lid 110 may have at least one enlarged overhang portion, e.g., tab 116, to provide a gripping region to facilitate separation from the base 120 of the portion of the lid 110 including the tab 116 (e.g., the first part 112 of the lid 110). As discussed above, one section of the lid 110 (e.g., the first part 112 of the lid 110) may include a boss or protrusion (e.g., upward protrusion 172) and the other section may include a recess (e.g., indent 174), such that when one section of the lid 110 is completely opened, it can be pressed against the closed section of the lid 110, whereupon the boss 172 and recess 174 mate to maintain positioning of the opened section.

Figure 5:
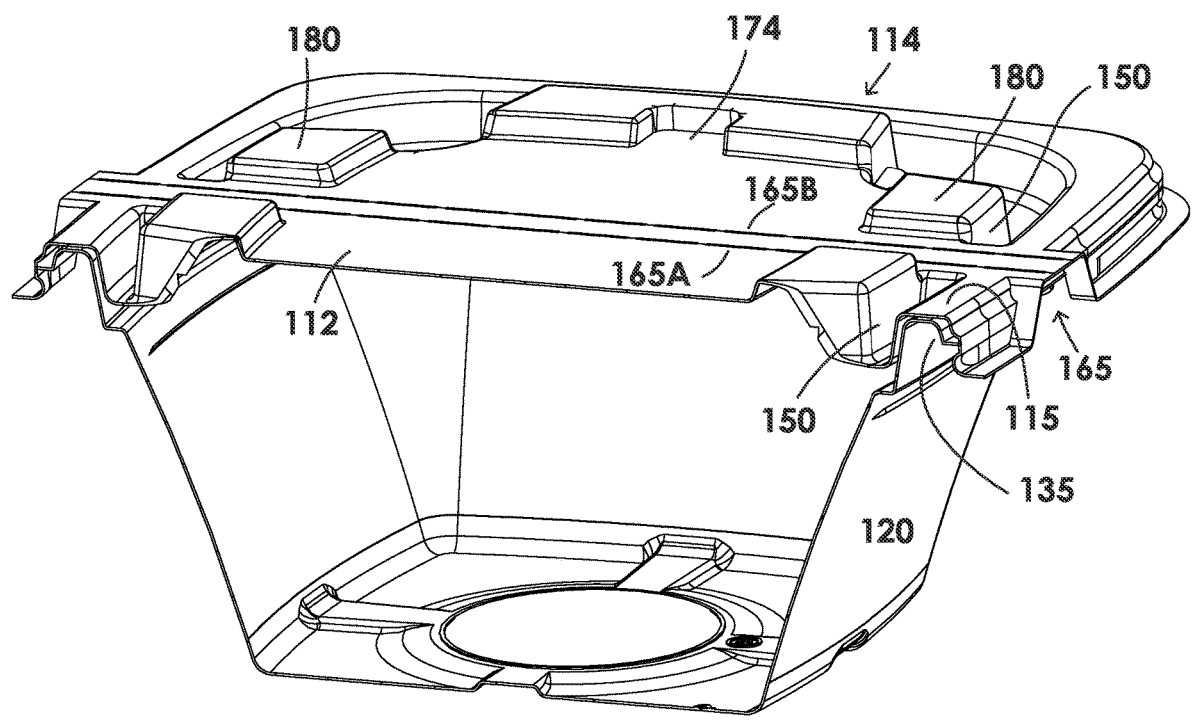
FIG. 5 is a cutaway view of a container system having a foldable lid according to at least one illustrated embodiment.
Figure 6:
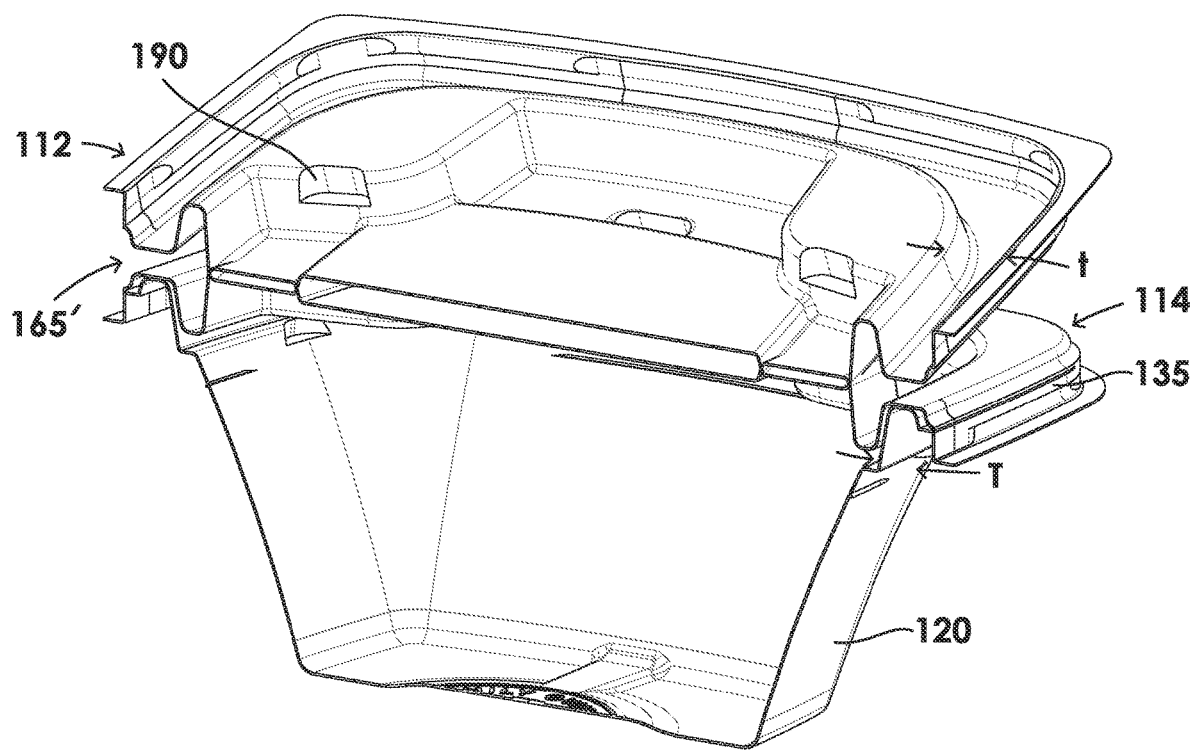
FIG. 6 is a cross sectional perspective view of another embodiment of a container having a foldable lid and a base.
Figure 7:
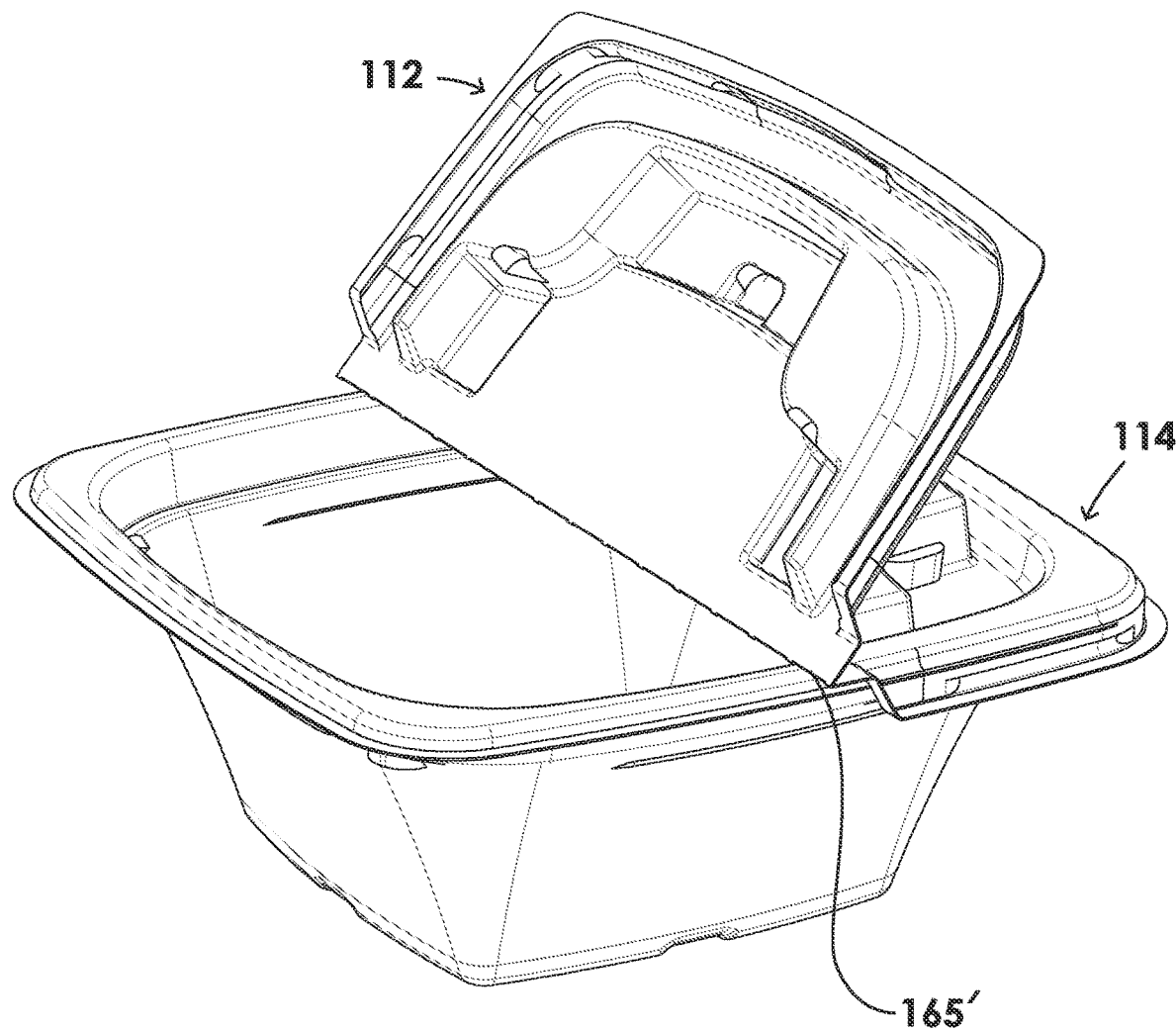
FIG. 7 is a perspective view of the container system of FIG. 6, with the lid shown attached at one end to the base and unattached and partially folded away at another end of the base.
Figure 8:
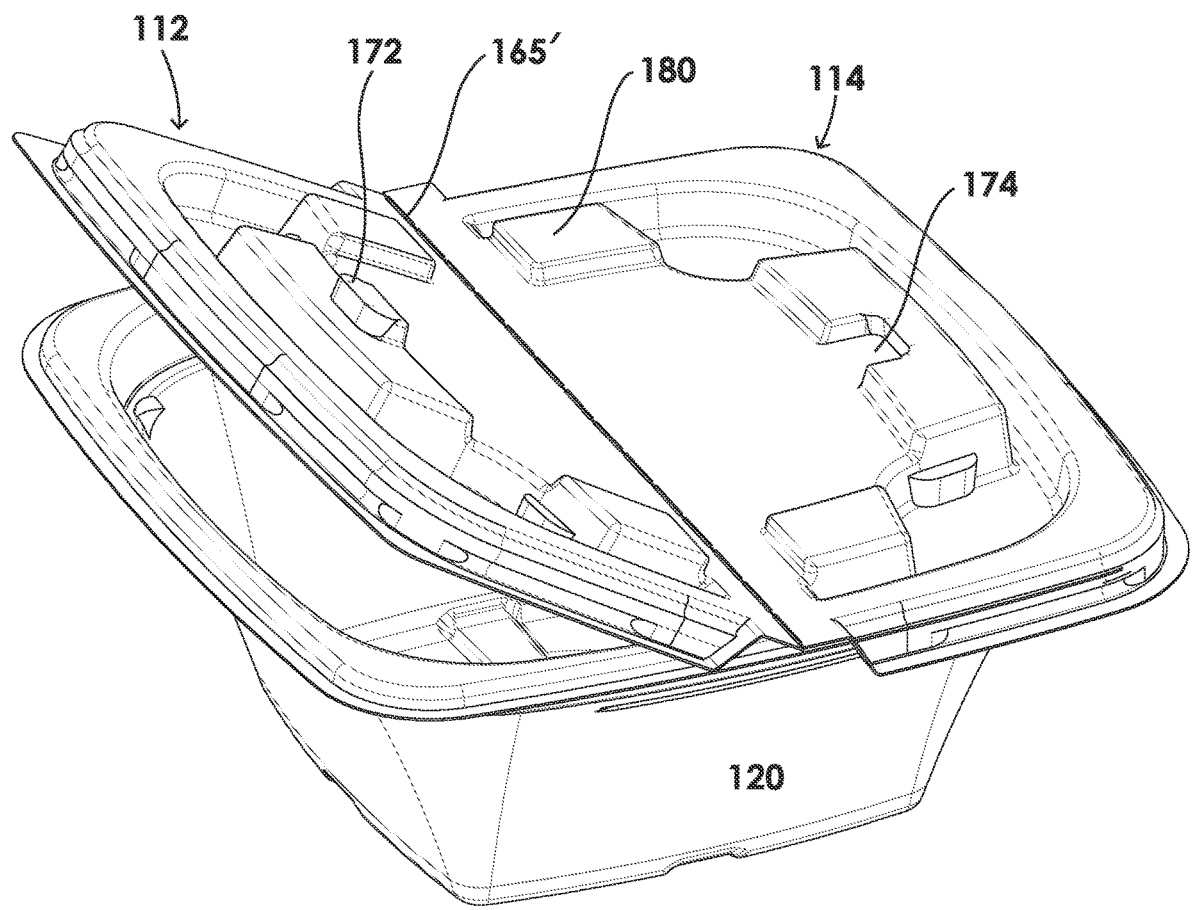
FIG. 8 is a perspective view of the container depicted in FIG. 7 but with the lid in a partially closed position with respect to the base.
Figure 9:
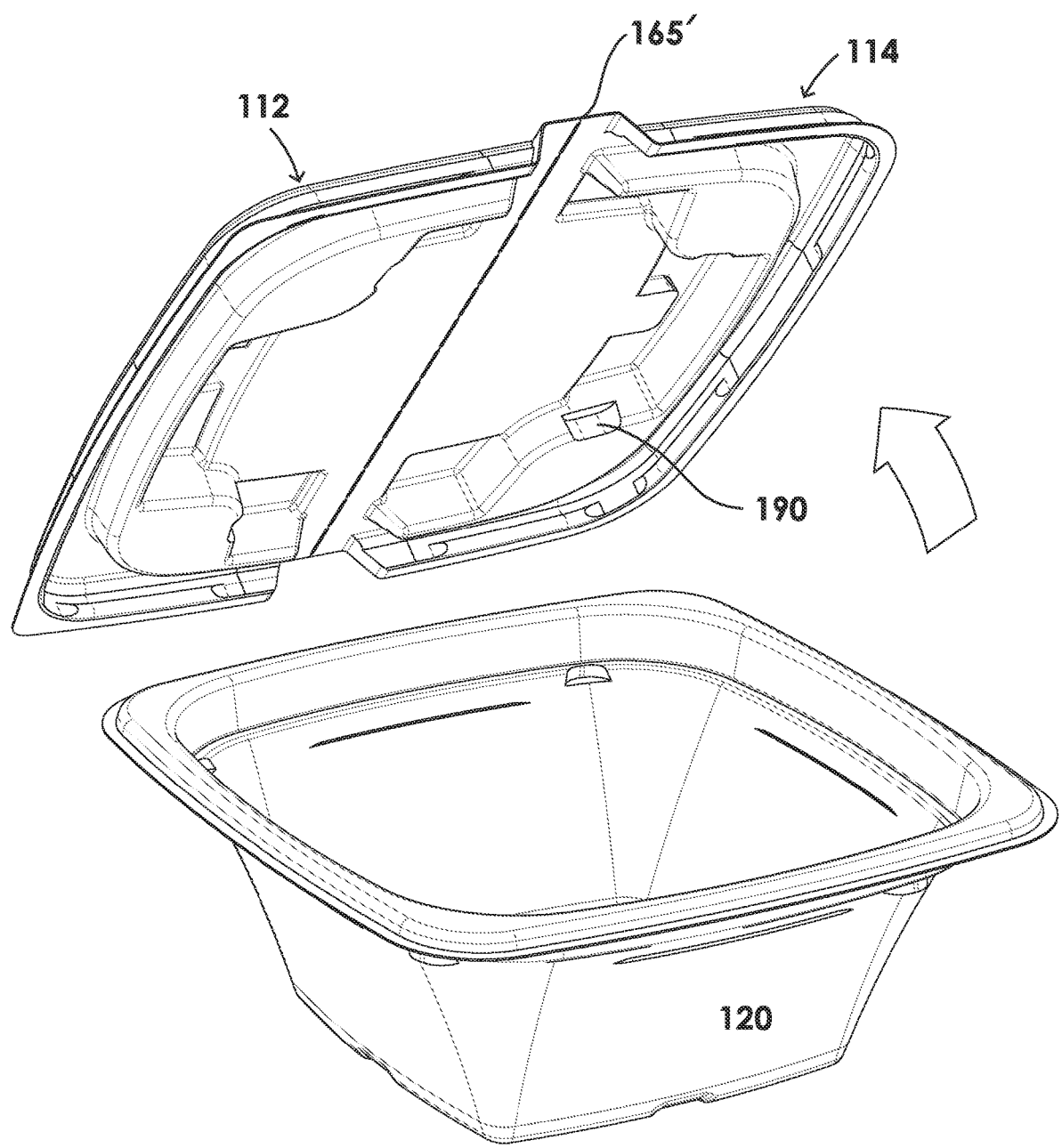
FIG. 9 shows the container of FIG. 6 but with the lid fully removed from the base.

FIG. 5 is a cutaway view showing how the outer rims 115 of the lid 110 press fit along corresponding lengths of the rims 135 of the base 120 to provide a secure fit between the lid 110 and the base 120. The lid 110 also has a pair of partial peripheral troughs 150 positioned radially inward of the outer rim 115 and outward of the lands 180.

Although alignment of the lands provides for a snap fit engagement between the protrusion 172 and indent 174 to secure the folded-back portion of the lid 112 to the portion of the lid still secured to the base, i.e. 114, an alternative embodiment will provide the folded-back portion of the lid with enough of an "opening space" simply by the resiliency of the material from which it is made. In such an embodiment, the two-hinge arrangement features 165A and 1658 can be replaced with a single hinge 165' as shown in FIGS. 6-9.

In this embodiment, the interlocking of features 172, 174 may not occur because those features are no longer aligned in view of the lack of area 165C which, as explained above, provides clearance for the lands 180. Therefore, the lands 180 can be omitted. As shown, the single hinge 165' allows a portion of the lid, i.e. 112, to be folded in a direction toward lid portion 114 once lid portion 112 is released from the corresponding portion of the base, namely by releasing rim 115 from rim 135 and then bending back against a bias of the hinge.

Once so-positioned, the lid portion 112 can then be released whereby it will maintain a partially opened state to provide access to the content of the container while the lid, by way of the continued engagement between lid portion 114 and base 120 remains attached. If the complete removal of the lid from the base is desired, these components can be detached by applying a force in a direction along the hinge axis (see FIG. 9) to disengage all portions of rim 115 from rim 135.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. It is the intention, therefore, to be limited only as indicated by the scope of the claims appended hereto.

What is claimed is:
1. A container system, comprising:
   a base having a bottom and one or more sidewalls extending from the bottom to define an interior volume, the base having a base rim having a thickness T at a peripheral edge of the one or more sidewalls, the base rim having an inner periphery substantially smoothly contoured about its entire extent; and
   a lid having a top surface, the top surface comprising:
   a first part having a first peripheral outer rim defining a first channel having a width t, the first channel formed by a first partial peripheral trough in the top surface radially inward of the first peripheral outer rim;

a second part having a second peripheral outer rim defining a second channel having the width t, the second channel formed by a second partial peripheral trough in the top surface radially inward of the second peripheral outer rim, the thickness T of the base rim and the width t of the first and second channels dimensioned to releasably engage with each other in a coupling arrangement, and a double hinged region extending across a width of the lid between the first part and the second part, the double hinged region having a first and a second hinge extending across the width of the lid and separated by a longitudinally extending area about which the lid folds as the first part of the lid is lifted from the base to disengage portions of the base rim from the first channel and to pivot the first part to provide access to the interior volume of the base while the second part of the lid on an opposite side of the hinge remains secured and attached to the base, the first and second peripheral outer rims being discontinuous at edges of the longitudinally extending area by the base rim;

wherein said first part of the lid contains a first land on its upper surface, said second part of the lid contains a second land on its upper surface, and wherein said first and second lands are radially inward of the first and second partial peripheral troughs and are brought in opposing proximity to each other when the first part of the lid is moved to the open position, the first and second lands having a height above the upper surface such that the longitudinally extending area provides a vertical offset in the hinged region to provide clearance for the first land and the second land when the first part of the lid is in the open position.

2. The container system of claim 1, wherein the lid comprises a lock to removably attach the first part of the lid to the second part of the lid when first part of the lid is moved to the open position.

3. The container system of claim 2, wherein the lock comprises an upward protrusion on one of the first part of the lid and the second part of the lid and an indent to receive the protrusion on the other of the first part of the lid and the second part of the lid.

4. The container system of claim 1, wherein the base is substantially rectangular or substantially square and is formed of plastic or molded fiber and the lid has a corresponding substantially rectangular or substantially square shape and is formed of plastic.

5. The container system of claim 3, wherein one of the first and second lands has a height being less than a height of the protrusion of the lock and greater than a height of the first and second channels.

6. A container system, comprising:

a base having a bottom and one or more sidewalls extending from the bottom to define an interior volume, the base having a rim having a thickness T at a peripheral edge of the one or more sidewalls; and a lid having a peripheral outer rim defining a channel having a width t, the lid comprising an upper surface and a hinged region having first and second hinges extending across the width of the lid and, defining an interstitial area between the first and second hinges and extending to the rim of the base, about which hinged region the lid folds as a first part of the lid is lifted to provide access to the interior volume of the base while a second part of the lid on an opposite side of the hinge remains attached to the base by a coupling arrangement between the rim of the base and the channel of the lid, the peripheral outer rim being discontinuous at edges of the interstitial area at the rim of the base, wherein said first part of the lid contains a first land on its upper surface, said second part of the lid contains a second land on its upper surface, and wherein said first and second lands are radially inward of the coupling arrangement and are brought in opposing proximity to each other when the first part of the lid is moved to an open position, the interstitial area providing a vertical offset in the hinged region to provide clearance for the first land and the second land when the first part of the lid is in the open position.

7. The container system of claim 6, wherein the channel is formed by partial peripheral troughs in the upper surface positioned radially inward of the peripheral outer rim and outward of the first and second lands and the hinged region extends across the width of the lid in alignment with ends of the partial peripheral troughs.

8. The container system of claim 6, wherein the first part of the lid forms an interference fit with at least a first portion of the rim of the base.

9. The container system of claim 6, wherein the lid comprises a lock to removably attach the first part of the lid to the second part of the lid when the first part of the lid is folded to a position in which a top surface of the first part of the lid meets a top surface of the second part of the lid.

10. The container system of claim 9, wherein the lock comprises an upward protrusion on one of the first part of the lid and the second part of the lid and an indent to receive the protrusion on the other of the first part of the lid and the second part of the lid.

11. The container system of claim 6, wherein the base is substantially rectangular or substantially square and is formed of plastic or molded fiber and the lid has a corresponding substantially rectangular or substantially square shape and is formed of plastic.

12. The container system of claim 10, wherein one of the first and second lands has a height less than a height of the protrusion of the lock and greater than a height of the channel.

* * * * *